(No Model.)
M. A. PIGOTT.
STONE CUTTING MACHINE.
No. 490,721. Patented Jan. 31, 1893.
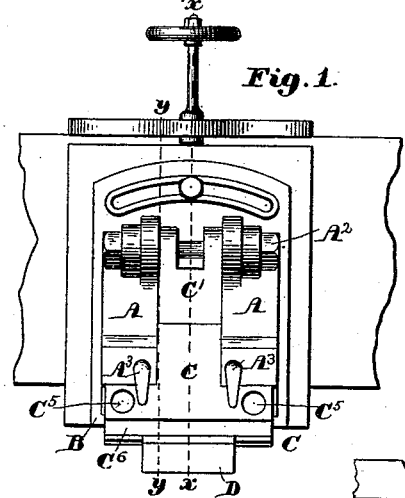
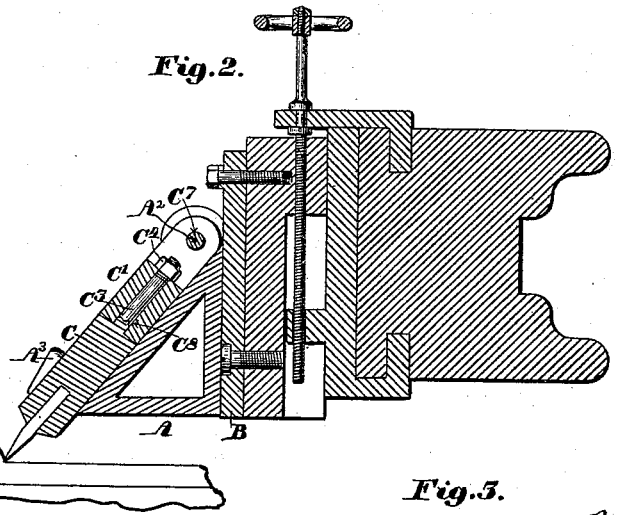
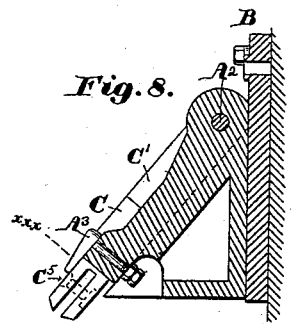
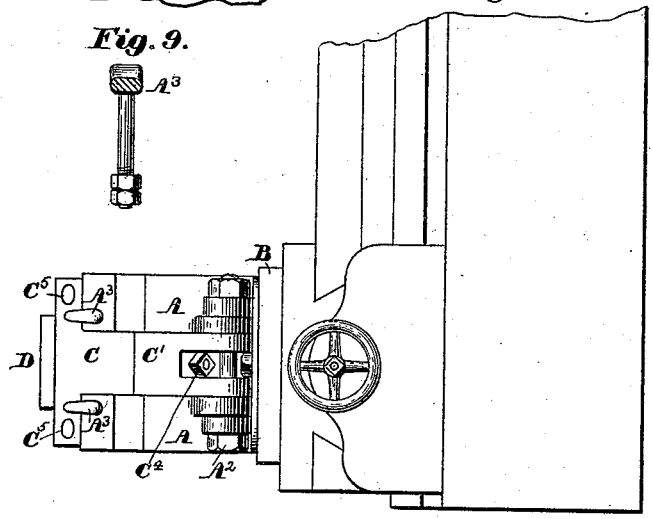
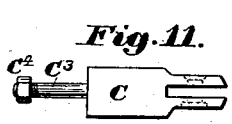
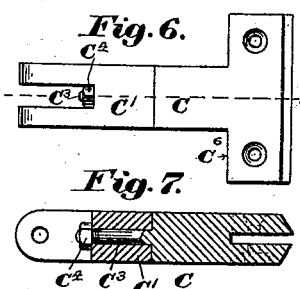
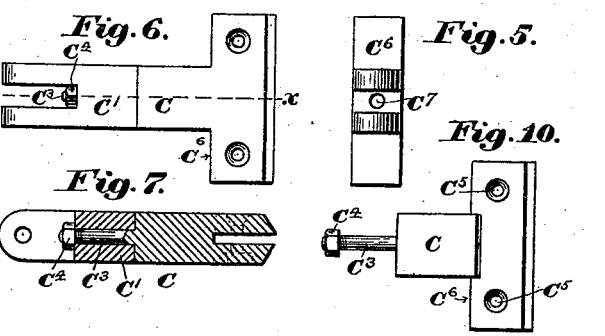
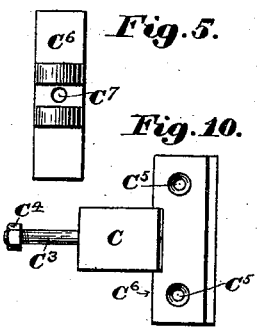
Witnesses:
Inventor:
M. A. Pigott
per Cyrus Carroll
Attorney.

UNITED STATES PATENT OFFICE.

MICHAEL A. PIGOTT, OF HAMILTON, CANADA.

STONE-CUTTING MACHINE.

SPECIFICATION forming part of Letters Patent No. 490,721, dated January 31, 1893.

Application filed July 7, 1892. Serial No. 439,291. (No model.)

*To all whom it may concern:*

Be it known that I, MICHAEL A. PIGOTT, a subject of the Queen of Great Britain, residing at Hamilton, in the county of Wentworth, in the Province of Ontario, in the Dominion of Canada, have invented a new and useful Tool-Holder for Holding the Cutting-Tool in a Stone-Cutting Machine, (for which I have not obtained a patent in any country,) of which the following is a specification.

My invention relates to the tool holder which in a stone cutting machine holds the tool rigidly, while the stone is passing under, toward and against the cutting edge of the cutting-tool in the operation of cutting or dressing the stone.

The objects of my invention are first to provide a tool-holder that will not only hold the tool firmly, and at the required angle to the face of the table, but that will admit of the tool holder being quickly released from its seat so that it can instantly be reversed on its longitudinal axis, and with it, the tool itself reversed during the return of the stone after a cut is taken, so that such reversing shall not cause the stopping, or even the slowing up of the regular motion of the machine, and secondly, to so apply the cutting tool to the stone at each stroke, as to leave the faces and edges of the stone straight even and regular, instead of their being more or less irregularly chipped and dressed, as is usually the case with stone cutting machines. I attain these objects in the following manner.

I have found by experiment that if the cutting tool is placed nearly perpendicular to the table, it will often bend on striking an unusually hard piece in the stone; at such time the whole machine, and the stone will be greatly jarred, not only straining the machine, but tending to rupture the stone, so as to cause it to be chipped in an irregular manner, more especially if there be any flaws in it. I have found too, that when the tool is set at too great an angle to the face of the table, say forty-five degrees, it may rise and ride. The angle therefore at which the cutting tool is to be set must generally be less than forty degrees from the perpendicular, the amount of inclination required, being in some degree dependent on the hardness of the stone. I have found by experiment that the stone exerts a grinding action in its contact with the cutting tool, also that to produce the best effects, the sharp cutting edge must be that in intimate contact with the face of the stone. Now as the cutting tool passes once over the stone its under sharp edge is ground away, leaving at the end of the stroke the sharp cutting edge on the upper side of the cutting tool, which it is now requisite to turn over so as to put such sharp cutting edge on the under side of it without delay ready to effectually give the next cutting. In this way the cutting tool always keeps sharp,—has its sharp edge presented to the stone at the beginning of every cutting, so as to cut straight and even, without plucking. Plucking spoils the stone. By this keeping of the cutting edge down to the stone power is saved, the power used being just sufficient to cut the stone, and no more. Without using this device the same ends can only be accomplished by taking out the cutting tool, reversing, inserting adjusting and securing it at every cutting, at the expense of from one half to two thirds of the total working time of the machine, while by using this device, as already stated no time whatever is lost.

Reference is made to the accompanying drawings in which;

Figure 1, represents a front elevation of the tool-holder in its seat in the tool-block.—the tool block itself being necessarily shown as well as the iron plate to which both tool holder and tool block are pivoted, as well as some of the usual accessory parts required in raising lowering and shifting the tool block, and with it the tool itself, necessary in the operations of cutting stone—but which accessory parts, are too common and well known to require to be herein particularly shown or described. Fig. 2, is a cross section on line $x, x$, of Fig. 1. Fig. 3, is a plan or top view of Fig. 1. Fig. 4 is a cross section of the tool block on line $y, y$, of Fig. 1. Fig. 5, is a top end view of the tool-holder. Fig. 6, is a plan of the tool holder, Fig. 7 is a cross section on line $x, x$, of Fig. 6. Fig. 8, is a cross-section on line $x-x$ Fig. 1; Fig. 9, is an elevation partly in section of the part C, Fig. 6; Fig. 10, is a plan of said part, and Fig. 11 is a side elevation of same.

Similar letters refer to similar parts in all the figures.

The tool block A, is pivoted to the beveling plate B, by the bolt $A^2$. There is a seat in the tool block A. It is just wide enough to contain the tool-holder C, without pinching, for the part C, by its part $C^3$, is swiveled in the part C', and it is by this swiveling that the part C and with it the tool itself is reversed, and that without reversing the part C', but as it is necessary that the part C should remain perfectly rigid during the cutting stroke, it has to be prevented from swiveling while the cutting stroke is being made,—for which purpose it is confined on the face of the tool holder by the dogs $A^3$.—It is prevented from moving sidewise by the sides or flanges A'—which also assist the dogs $A^3$, in preventing the part C from swiveling, while the cutting stroke is being made. The sides of the tool block A on each side of the tool holder seat rise like a flange on both sides,—see A', in Fig. 4. Each side or flange A' is pierced for the bolt $A^2$. In each side or flange A', is a dog $A^3$, turning freely—These are used by turning so as to secure the device C firmly in its seat, and to release it. The shoulders $A^4$, are square and against them, the shoulders $C^6$, of the tool holder C, impinge when the stone is being cut. This prevents the strain from coming on the other parts. The part C, is made of a single block of steel or wrought iron T-shaped with a slot in it to contain the cutting tool D. The upper end of the part C, namely $C^3$, seen in section in Figs. 2 and 7, is made round and provided with a nut $C^4$, seen in Figs. 1, 2, 3, and 7. It is pierced for the bolts $C^5$, and the part C' is pierced with the hole $C^8$, to admit the part $C^3$. The part C', is also made of a single block of steel or wrought iron, provided with a slot at the upper end to admit of the free passage of the nut $C^4$.—The upper ends of the flanges are rounded at the ends and pierced for the bolt $A^2$ by which it is pivoted to the tool block A. The lower end of the part C', is provided with a circular hole $C^7$, to admit the part $C^3$. The heads and nuts of the bolts $C^5$, must be countersunk flush with the surface,—the nuts to have space enough not only to turn in, but to admit of a sufficient wrench being used.

Let us suppose that a cut has just been made, and the cutting tool D, worn so as to have its sharp cutting edge somewhat above its center-line. While the stone is returning to get into position to take another cut, the operator turns the dogs $A^3$, releases and raises the tool holder C, swivels or reverses it on its longitudinal axis, and with it the cutting tool D, drops it again into its seat, and secures it again by turning the dogs $A^3$. The sharp cutting edge of the tool D is now on the underside, ready to begin the next cut without delay the whole operation having been performed during the return of the stone to position without stopping or even slowing up—thus absolutely losing no time. This tool holder C, can be attached to any ordinary iron planer, by carrying with it the tool block A, and properly attaching it—when it can be used for cutting stone.

Having described my invention what I claim and desire to secure by Letters Patent is;

In a stone cutting machine the combination with the tool block A. having flanges A' and dogs $A^3$, of the tool-holder C, comprising the parts C, C', $C^3$, $C^4$, and $C^5$, the part C being swiveled to the part C', by the bolt or part $C^3$.,—the parts being constructed and arranged to operate substantially as set forth.

Hamilton, July 1, 1892.

M. A. PIGOTT.

In presence of—
 JNO. LEWIS,
 C. CARROLL.